(12) United States Patent
Voskuhl et al.

(10) Patent No.: US 8,583,471 B1
(45) Date of Patent: Nov. 12, 2013

(54) INFERRING HOUSEHOLD INCOME FOR USERS OF A SOCIAL NETWORKING SYSTEM

(75) Inventors: Justin B. Voskuhl, Seattle, WA (US); Ramesh Vyaghrapuri, Kenmore, WA (US)

(73) Assignee: Facebook, Inc., Menlo Park, CA (US)

( * ) Notice: Subject to any disclaimer, the term of this patent is extended or adjusted under 35 U.S.C. 154(b) by 39 days.

(21) Appl. No.: 13/338,174

(22) Filed: Dec. 27, 2011

Related U.S. Application Data

(63) Continuation of application No. 13/159,373, filed on Jun. 13, 2011.

(51) Int. Cl.
*G06Q 10/00* (2012.01)
*G06Q 30/00* (2012.01)

(52) U.S. Cl.
USPC ..................... 705/7.33; 705/14.53

(58) Field of Classification Search
USPC .............................. 705/7.33, 14.53
See application file for complete search history.

(56) References Cited

U.S. PATENT DOCUMENTS

| | | | |
|---|---|---|---|
| 2001/0049620 A1* | 12/2001 | Blasko | 705/10 |
| 2002/0099605 A1* | 7/2002 | Weitzman et al. | 705/14 |
| 2006/0161599 A1* | 7/2006 | Rosen | 707/201 |
| 2007/0055621 A1* | 3/2007 | Tischler et al. | 705/38 |
| 2007/0124235 A1 | 5/2007 | Chakraborty et al. | |
| 2010/0076850 A1* | 3/2010 | Parekh et al. | 705/14.66 |
| 2010/0203876 A1* | 8/2010 | Krishnaswamy | 455/418 |
| 2011/0153421 A1* | 6/2011 | Novikov et al. | 705/14.52 |
| 2012/0110071 A1* | 5/2012 | Zhou et al. | 709/204 |
| 2012/0166532 A1 | 6/2012 | Juan et al. | |
| 2013/0035989 A1* | 2/2013 | Brown et al. | 705/7.33 |

OTHER PUBLICATIONS

Mislove, A. et al., "You Are Who You Know: Inferring User Profiles in Online Social Networks," Proceedings of the Third ACM International Conference on Web Search and Data Mining, Feb. 4-6, 2010; pp. 251-260, New York, New York, USA.*
U.S. Office Action, U.S. Appl. No. 13/615,476, Jan. 4, 2013, twelve pages.
Mislove, A. et al., "You Are Who You Know: Inferring User Profiles in Online Social Networks," *Proceedings of the Third ACM International Conference on Web Search and Data Mining*, Feb. 4-6, 2010, pp. 251-260, New York, New York, USA.
U.S. Office Action, U.S. Appl. No. 13/615,476, May 8, 2013, twelve pages.

* cited by examiner

*Primary Examiner* — David Rines
*Assistant Examiner* — Amanda Gurski
(74) *Attorney, Agent, or Firm* — Fenwick & West LLP

(57) ABSTRACT

Information about a set of users of a social networking system is obtained to develop a predictive model of income distribution for all users of the social networking system. This predictive model is based on selected attributes about the users (e.g., declared/profile information, user historical information, and/or social information). Users of the social networking system are mapped to a specific income bracket based on statistical correlations derived from the predictive model. Advertisements are targeted to users based on income bracket. The system may use a machine learning algorithm to analyze conversion rates of targeted advertising to retrain the predictive model.

14 Claims, 5 Drawing Sheets

INFERRING HOUSEHOLD INCOME FOR USERS OF A SOCIAL NETWORKING SYSTEM

CROSS REFERENCE TO RELATED APPLICATIONS

This application is a continuation of U.S. application Ser. No. 13/159,373, filed Jun. 13, 2011, which is incorporated by reference in its entirety.

BACKGROUND

This invention relates generally to social networking, and in particular to inferring household income for users of a social networking system for targeting advertisements.

Traditional targeting criteria for advertising relies on demographic data and structured information, such as a user's self-declared interests and intentions to be marketable (e.g., to be in the market to purchase a product or service). Advertisers, in an effort to locate and target these users, purchase analytical data gathered by third parties that track users visiting websites related to the advertiser's product. For example, websites on the Internet track people comparing car prices and filling out a form for a test drive at a local dealership and sell this information to advertisers. Ultimately, advertisers depend on this analytical data, which assumes users have enough household income to make a purchase.

In recent years, users of social networking systems have shared their interests and engaged with other users of the social networking systems by sharing photos, real-time status updates, and playing social games. The amount of information gathered from users is staggering-information describing recent moves to a new city, graduations, births, engagements, marriages, and the like. Social networking systems have been passively recording this information as part of the user experience, but social networking systems have lacked tools to synthesize this information about users for targeting advertisements based on their perceived income.

Specifically, the information available on social networking systems has not been used to infer the household income of users of a social networking system. Information about users' household income is very valuable to advertisers that seek to market luxury goods and services to these users. However, existing systems have not provided advertisers with users that have been categorized by inferred household income ranges.

SUMMARY

Information about a set of users of a social networking system is obtained to develop a predictive model of income distribution for all users of the social networking system. This predictive model is based on selected attributes about the users (e.g., declared/profile information, user history, and/or social information). Users of the social networking system are mapped to a specific income bracket based on statistical correlations derived from the predictive model. Advertisements are targeted to users based on income bracket. In one embodiment, the system uses a machine learning algorithm to analyze conversion rates of targeted advertising to retrain the predictive model.

Figure 1:
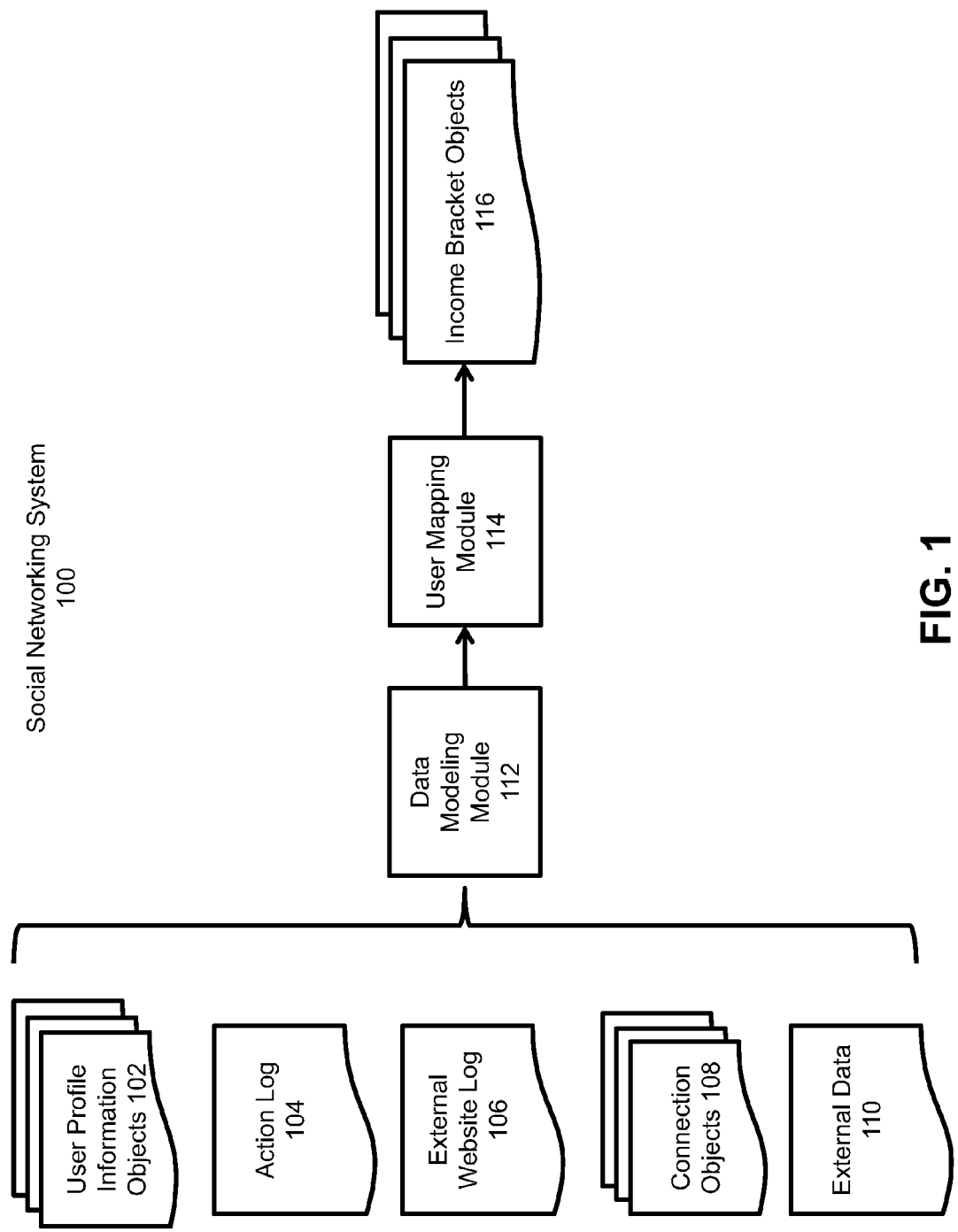
FIG. 1 is high level block diagram illustrating a process of inferring household income of users of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. The social networking system may also use user profile information to direct advertisements to the user, ensuring that only relevant advertisements are directed to the user. Relevant advertisements ensure that advertising spending reaches their intended audiences, rather than wasting shrinking resources on users that are likely to ignore the advertisement.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

A social networking system may also attempt to infer information about its users. A social networking system may analyze posted content by users that include keywords, such as "Prada" and "BMW." Image recognition software could also help identify brand names in pictures posted by users, for example. This information can be analyzed to infer purchasing habits of users on the social networking system that may be indicators of household income.

Further, user profile information for a user is often not complete, and it may not even be completely accurate. For example, users may deliberately provide incorrect information, such as providing incorrect age in the user profile. Users may also forget to update their information when it changes. For example, a user may move to a new location and forget to update the user's geographical location, or a user may change jobs but forget to update their workplace description in the user profile. As a result, a social networking system may infer certain profile attributes of a user, such as geographic location, educational institutions attended, and age range, by analyzing the user's connections and their declared profile information. Inferring profile attributes are further discussed in U.S. application Ser. No. 12/916,322, filed on Oct. 29, 2010, which is hereby incorporated by reference.

Even though a social networking system may collect, and in some cases infer, information about its users, significant resources must be expended to organize the staggering amounts of data collected. A social networking system having hundreds of millions of users, for example, gathers and infers a staggering amount of information about its users. To address issues of scalability and efficiently expending computing resources, a social networking system provides a snapshot of databases for modules to process. Recent changes in a user's personal life, such as an engagement, birth of a child, moving across the country, graduating from college, and starting a new job, can be collected and inferred from these snapshots on social networking systems. These life events may be analyzed as indicators of household income.

Reliable information about the household income of users of a social networking system is very valuable to advertisers because certain advertisers may wish to focus their advertisements on higher income users that have the discretionary income to afford the products being advertised. For example, users who recently changed jobs may be more susceptible to clicking on an advertisement for a new luxury car, such as a BMW, because they may have more disposable income due to the new job.

Some users may engage in "profile fraud," deliberately making false statements about themselves and other users on the social networking system. For example, some users may change their relationship status to "married" even though, in reality, the users are not actually married. Other users may indicate a sibling or parent-child relationship in the same manner. Accordingly, to infer reliable household income users, a social networking system may be designed to authenticate potential advertising income brackets of users for accuracy to identify and exclude these fraudulent users. Machine learning, heuristics analysis, and regression analysis may be used in authenticating the placement of users in income brackets using the predictive model described herein.

FIG. 1 illustrates a high level block diagram of a process for inferring household income of users of a social networking system, in one embodiment. The social networking system 100 uses different types of information about users in the process of inferring household income, including user profile information objects 102, an action log 104, an external website log 106, connection objects 108, and external data 110. Each user of the social networking system 100 is associated with a specific user profile information object 102. These user profile information objects 102 include declarative information about the user that was explicitly shared by the user as well as any profile information inferred by the social networking system 100. In one embodiment, a user profile information object 102 may include thirty or more different data fields, each data field describing an attribute of the corresponding user of the social networking system 100.

Users of the social networking system 100 may take actions using the social networking system 100 that are associated with one or more objects. Information describing these actions is stored in the action log 104. The action log 104 includes many different types of interactions that occur on a social networking system, including commenting on a photo album, communications between users, becoming a fan of a musician, and adding an event to a calendar. Additionally, the action log 104 records a user's interactions with advertisements on the social networking system 100 as well as other applications operating on the social networking system 100.

An external website log 106 may be used by a social networking system 100 to track users' actions on external websites that communication information back to the social networking system 100. For example, an e-commerce website that primarily sells luxury shoes at bargain prices may recognize a user of a social networking system 100 through website plug-ins that enable the e-commerce website to identify the user. Because users of the social networking system 100 are uniquely identifiable, e-commerce websites, such as this luxury shoe reseller, may use the information about these users as they visit their websites. An external website log 106 records data about these users, including viewing histories, advertisements that were clicked on, purchasing activity, and buying patterns.

Connection objects 108 store information about users' connections on a social networking system 100. Such information may include the interactions between the user and the connection on the social networking system 100, including wall posts, comments on photos, geographic places where they have been tagged together, and photos in which they have both been tagged in. In one embodiment, a connection object 108 includes information about the strength of the connection between the users, such as an affinity score. If a user has a high affinity score for a particular connection, the social networking system 100 has recognized that the user interacts highly with that connection. Affinity scores and methods of gathering this social data from a social networking system are described further in U.S. Application Ser. No. 12/978,265, filed on Dec. 23, 2010, which hereby incorporated by reference.

External data 110 may be used by a social networking system 100 for a subset of users to develop a predictive model of inferring household income for all users. This external data 110 may be licensed by administrators of the social networking system 100 and includes actual estimates of household income for the users in the dataset. For example, external data 110 may be licensed from ComScore or Nielsen for fifty thousand users of the social networking system 100. After a predictive model is developed using this external data 110, the predictive model would be used to infer the household income of all of the five hundred million users of the social networking system, for example.

The predictive model is developed and tested using a data modeling module 112. The data modeling module 112 uses information that is available about users of the social networking system 100 to develop, test, and use a predictive model of inferring household income for the users. This information is gathered from user profile information objects 102, the action log 104, the external website log 106, connection objects 108, and external data 110 described above. The data modeling module 112 uses this information to define which attributes and behaviors of users of the social networking system 100 correlate to the distribution of income in the predictive model. As more information is gathered about users of the social networking system 100, the data modeling module 112 may be used to alter the predictive model for inferring household income, giving more or less weight to a specific attribute or behavior of a user, such as the college(s) attended by the user.

The predictive model may be initially defined, in one embodiment, using the probabilistic distribution of income of a "golden dataset" of users, i.e., licensed data that includes income data for a random sampling of users of the social networking system. Using the golden dataset of users, a probability distribution of income can be generated by the data modeling module 112, establishing a basis for the predictive model to make statistical inferences about all users of the social networking system. Income ranges, or brackets, can be defined in $25,000 increments for U.S.-based users, for example. For non-U.S.-based users, country-specific income brackets may be defined, in one embodiment. In another embodiment, income brackets may be defined by percentages (e.g., top 10%, or bottom 33%) of the population of users on the social networking system.

Continuing the example of using fifty thousand users as the golden dataset of users, administrators of the social networking system may analyze the dataset and select certain attributes that appear to be directly correlated to a user's income. If one of the users in the golden dataset earns $35,000 per year, as indicated by the external data 110 licensed by the administrators of the social networking system, that user should be associated with the second-lowest income bracket. Administrators may examine that user's attributes and behaviors on the social networking system to determine characteristics or indicators that could be used to infer the income of other users exhibiting similar characteristics or indicators.

These characteristics and indicators would form a predictive model for the second-lowest income bracket such that a user mapping module 114 could map another user to that bracket. In this way, the income of that user is inferred by the social networking system 100. Each defined income bracket is associated with an income bracket object 116. As users are mapped to income brackets by the user mapping module 114, the user profile information objects 102 are associated with the corresponding income bracket object 116 for the mapped income bracket.

Once users of a social networking system 100 have been associated with income bracket objects 116, the household income of users can be inferred by the social networking system 100 by analyzing relationships between the users. A married couple usually combines their income to create household income. Similarly, the user mapping module 114, in one embodiment, recognizes married users, combines their income brackets, and associates both users with the income bracket object 116 corresponding to their combined income. Other types of relationships, including engaged users, parent-child, siblings, and roommates, may also be recognized by the user mapping module 114, in one embodiment, and may have their incomes combined in the same fashion.

As mentioned above, some users of the social networking system 100 engage in profile fraud, deliberately misrepresenting information on their profile. To avoid associating users who are not actually married, other modules in the social networking system 100 may be used to police this type of behavior. Heuristics analysis may be used to identify these false positives and analyze unstructured data such as interaction analysis between users. For example, an income bracket object 116 may be associated with a user that has fraudulently indicated that another user is his parent. Heuristics analysis may be used to identify this user by calculating the age difference between the declared parent and child and flagging the user if the difference is less than 14 years. Additionally, the heuristics algorithm may check the last names of the users for a match and whether the users have similarities using facial recognition software that compares photos of the users.

The conversion rates of advertisements, or the rates of how many users actually clicked through the advertisement and made a purchase, based on these income brackets may be analyzed by administrators of the social networking system 100. Information about these conversion rates may be used, in one embodiment, to adjust the predictive model that was initially defined using the golden dataset of income information about users of the social networking system 100. For example, if a certain characteristic, such as which college the user attended, was used to infer a higher income bracket, and the conversion rates of those targeted users were low for luxury goods, that predictive factor may be given less weight in the predictive model.

System Architecture

Figure 2:
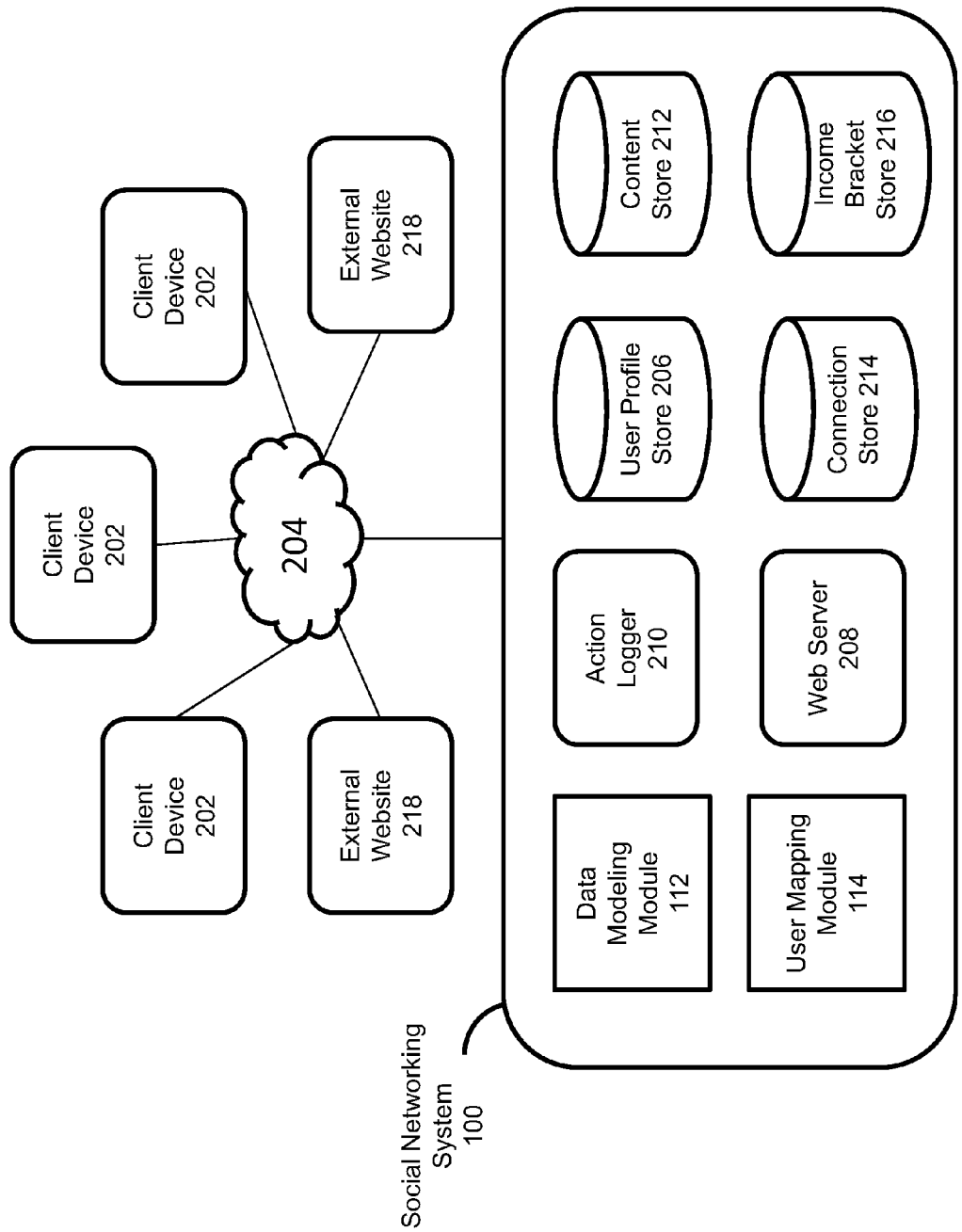
FIG. 2 is a network diagram of a system for inferring household income of users of a social networking system, showing a block diagram of the social networking system, in accordance with an embodiment of the invention.

FIG. 2 is a high level block diagram illustrating a system environment suitable for inferring information describing users based on social networking information, in accordance with an embodiment of the invention. The system environment comprises one or more client devices 202, the social networking system 100, a network 204, and external website 218. In alternative configurations, different and/or additional modules can be included in the system.

The client devices 202 comprise one or more computing devices that can receive user input and can transmit and receive data via the network 204. In one embodiment, the client device 202 is a conventional computer system executing, for example, a Microsoft Windows-compatible operating system (OS), Apple OS X, and/or a Linux distribution. In another embodiment, the client device 202 can be a device having computer functionality, such as a personal digital assistant (PDA), mobile telephone, smart-phone, etc. The client device 202 is configured to communicate via network 204. The client device 202 can execute an application, for example, a browser application that allows a user of the client device 202 to interact with the social networking system 100. In another embodiment, the client device 202 interacts with the social networking system 100 through an application programming interface (API) that runs on the native operating system of the client device 202, such as iOS 4 and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, a content store 212, a connection store 214, an income bracket store 216, a data modeling module 112, and a user mapping module 114. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more client devices 202; the web server 208 serves web pages, as well as other web-related content, such as Java, Flash, XML, and so forth. The web server 208 may provide the functionality of receiving and routing messages between the social networking system 100 and the client devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native client device operating systems, such as iOS, ANDROID, webOS, and RIM.

Income bracket objects are developed by the data modeling module 112 in the social networking system 100. These income bracket objects are stored in the income bracket store 216. A user mapping module 114 associates users of the social networking system 100 with income bracket objects based on information about the users stored in their user profile information objects stored in the user profile store 206, external data gathered from external websites 218, actions taken by the users and recorded by an action logger 210, and information about the users' connections stored in the connection store 214.

The action logger 210 is capable of receiving communications from the web server 208 about user actions on and/or off the social networking system 100. The action logger 210 populates the action log 104 with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. A user profile store 206 maintains profile information about users of the social networking system 100, such as age, gender, interests, geographic location, email addresses, credit card information, and other personalized information. The user profile store 206 also maintains references to the actions stored in the action log 104 and performed on objects in the content store 212.

The connection store 214 stores the information describing the connections between users. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed. The connection store 214 acts as a cross-referencing database for the user profile store 206 and the content store 212 to determine which objects are also being modified by connections of a user.

Developing a Predictive Model to Infer Household Income

Figure 3:
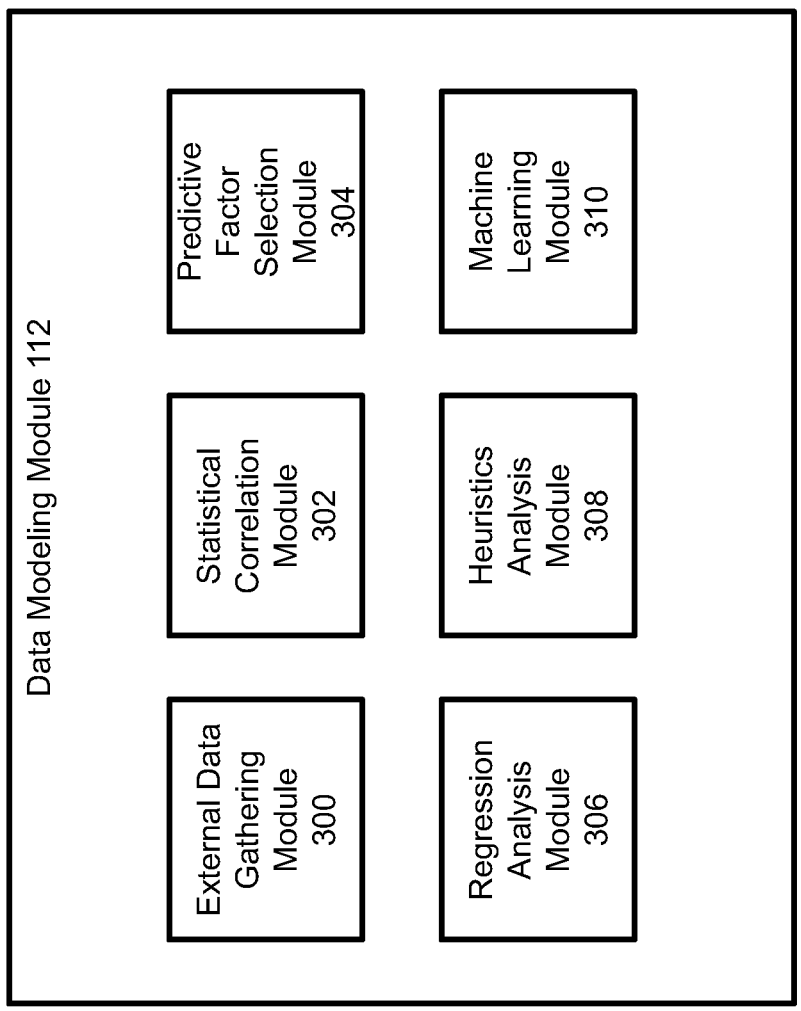
FIG. 3 is high level block diagram illustrating a data modeling module that includes various modules for developing a predictive model of income distribution for users of a social networking system, in accordance with an embodiment of the invention.

FIG. 3 illustrates a high level block diagram of the data modeling module 112 in further detail, in one embodiment. The data modeling module 112 includes an external data gathering module 300, a statistical correlation module 302, a predictive factor selection module 304, a regression analysis module 306, a heuristics analysis module 308, and a machine learning module 310. These modules may perform in conjunction with each other or independently to develop a predictive model of inferring household income for users of a social networking system 100.

An external data gathering module 300 interfaces with external websites to process information about users of the social networking system 100. This information may include ComScore data, Nielsen data, and other data licensed from third party providers. Additionally, the external data gathering module 300 may, in one embodiment, gather information about users and their actions taken on external websites that are connected to the social networking system 100 through the use of plug-ins on their websites. For example, a user may log into a live music concert website using a plug-in that allows information to be shared between that external website and the social networking system 100. If the user chooses to purchase concert tickets to the next Britney Spears concert on the external website, the social networking system 100 may collect that information and store an interest in Britney Spears in the user profile information object associated with the user, in one embodiment. The external data gathering module 300 may also collect other information about the user's actions on the external website, such as the price of the tickets and how frequently the user makes purchases on the live music concert website. This information may then be used as a factor in a predictive model for inferring household income for users of the social networking system 100.

The statistical correlation module 302 develops a correlation value for each factor in a predictive model for inferring income of users on the social networking system 100. A golden dataset of income information about a subset of users on the social networking system 100 is used as the basis of the predictive model. From this golden dataset of income information, a set of factors can be extracted from an analysis of the information based on the probabilistic distribution of the users. Returning to a previous example, a golden dataset included fifty thousand users can be segmented into income brackets of $25,000 increments (e.g., $0-$25,000, $25,000-$50,000, etc.). Analyzing each income bracket, a set of factors emerge that probabilistically indicate a correlation between the factor and the income bracket. If 95% of the users in the $100,000-$125,000 bracket have graduate degrees, for example, that factor may be selected as a factor to look at in developing the predictive model for inferring household income. The statistical correlation module 302 analyzes each income bracket and determines a correlation value for each factor that emerges in inferring the income bracket of the users. In this example, 0.95 is the statistical correlation value of having a graduate degree correlating to an income bracket of $100,000-$125,000. Using the golden dataset of income information in this manner, statistical inferences such as this can be made about the income of all users in the social networking system 100.

The statistical correlation module 302 may, in one embodiment, use unstructured information on the social networking system, gathered from user profile information objects 102, the action log 104, external website log 106, connection objects 108, and external data 110 to define predictive factors and calculate corresponding correlation values. Bursts of activity related to users in a specific geographic location, for example, can be detected by the social networking system 100 and identified. For example, it could be assumed that riots only occur in locations where users of a certain income bracket reside. Thus, if the word "riot" occurs in a burst of communications related to users in a specific geographic location, this could be interpreted by the statistical correlation module 302 as a predictive factor of income brackets and a corresponding correlation value could be calculated. The specific geographic locations where riots might be expected to occur, for example, could be predetermined from external data 110 gathered from a third party website that lists the property values of homes by geographic location. Bursts of activity can be detected by normatively scoring the communications against a past empirical data measuring such bursts of activity on the social networking system. A specific normative threshold of expected activity may be generated for pre-selected world events, such as riots, tornados, and floods. Other types of unstructured information can be similarly measured and scored, including image recognition of wedding photos, recognizing multiple check-ins at or around a particular geographic location, and a significant increase in the number of new friend requests, or new connections, from users in a different geographic location than the one indicated in the user's profile. Certain exceptions may be made, depending on the usage of the keyword, in one embodiment. For example, a status message indicating that "Shelly is such a riot!" does not imply that the user posting the message is in a lower income bracket. Language processing tools may be used to analyze the word usage of users and infer an income range. As an example, a user who frequently misspells words and uses incorrect grammar may be flagged as a user having a lower income than the average user who misspells words infrequently. By contrast, a user who writes perfect sentences complete with complex usage of grammar and prepositional phrases, for example, may be assumed to have a higher income bracket. Utilizing unstructured information to define predictive factors in inferring household income of users enables better predictive factors to emerge with higher correlation values.

A predictive factor selection module 304 selects a subset of the factors analyzed by the statistical correlation module 302 for use in a regression model developed by the regression analysis module 306. The selection of predictive factors may be manually selected by administrators of the social networking system 100, in one embodiment. In another embodiment, predictive factors may be selected to be used in the regression model if the correlation value for the factor, as determined by the statistical correlation module 302, is above a predetermined threshold. In yet another embodiment, the selected predictive factors may be a predetermined number of factors meeting the predetermined threshold.

The regression analysis module 306 uses a regression model to predict the income of users on the social networking system 100. Each income bracket has a separate regression model. The predictive factors for each income bracket are selected by the predictive factor selection module 304. Thus, an income bracket may have more or less predictive factors than its neighboring income brackets. The regression analysis module 306 may also add or remove predictive factors based on the performance of advertisements directed to users in specific income brackets. For example, suppose that the income of a user is inferred to be within the $100,000-$125,000 income bracket. If that user is targeted with advertisements for destination travel packages, luxury cars, and home mortgages, but explicitly declines each of those advertisements, the predictive factors that were selected to place that user in that income bracket may be modified manually by administrators or by the predictive factor selection module 304.

Using a combination of the predictive factors, the regression model for each income bracket assigns a coefficient to each of the predictive factors based on the probabilistic distribution of users from the golden dataset, i.e., the response. The regression analysis module 306 then determines a score that indicates whether a user is a good fit with golden dataset of users in the income bracket. A curve fit, or best fit, yields a number from 0 to 1 that can be used as the accuracy measurement of the income bracket, in one embodiment. The regression analysis module 306, in one embodiment, adapts the regression model to include or exclude factors that are determined to be relevant or not relevant to accurately inferring household income of users based on machine learning and heuristics analysis of the users.

A heuristics analysis module 308 operates independently and asynchronously from the other modules in the data modeling module 112. The heuristics analysis module 306 performs various steps to gather information from the social networking system 100. For example, the action log 104 includes actions that users perform on the social networking system. The heuristics analysis module 308 may be used to analyze the level of communications activity for particular users and determine whether those communications included certain keywords, such as "riot" as described above.

Another use of the heuristics analysis module 308 includes gathering and analyzing different types of information about a user's geographic location such as check-ins at places in a specific geographic location, attending events in the same geographic region, receiving requests for connecting with users from the same geographic area, and geo-location codes embedded in photos and other communications, such as text messages, uploaded to the social networking system by the user. The heuristics analysis module 308 may conclude, for example, that although a user may indicate in her profile that she is from Oakland, Calif., a relatively low-income city, she frequently attends events in an affluent community such as Atherton, Calif. and posts many check-ins at high-end boutique shops in Palo Alto, Calif. An inference may be made, by the statistical correlation module 302, that a user who attends events in affluent communities and posts check-ins frequently may actually have a higher likelihood of being in a higher income bracket than the average income bracket of the geographic location indicated in her user profile and calculate correlation values for those income brackets based on probabilistic distributions of users in the golden dataset.

The heuristics analysis module 308 also determines, in one embodiment, the various locations of the connections of the user to infer the location of a user based on a subset of the connections of the user that interact frequently with the user. As mentioned above, the geographic location of the user may be used as a predictive factor in inferring household income based on external data detailing the property values of the geographic location of the user. Inferring the location of a user through interactions between users and their connections, such as exchanges of messages, wall posts, comments made on photos or videos, recommendations made to other users, and the like. Users that have not interacted with the user for a long time can be excluded since there is a possibility that they are old connections of the user and the user may have moved to a different location. The locations of the subset of the connections of the user are analyzed to determine the number of connections at each location. The location of the user is inferred as the location with the highest number of connections of the user that frequently interact with the user. For example, if the user frequently interacts with a large number of users residing in a particular city, it may be inferred that the user resides in that city. Similarly, if the user interacts with users in different cities of the same country, that country can be inferred as the user's country of residence.

The location of a user may be determined by the heuristics analysis module 308 based on other factors, in another embodiment, based on the internet protocol (IP) address associated with sessions created by the user. Various communication protocols provide IP address of a client device used to establish communication with a server in the social networking system 100. The IP address of the client device can be mapped to geographical location of the machines using the IP address. As a result, the geographical location of the client device can be determined. Some client devices are equipped with global positioning systems (GPS) and the location of the client device as provided by GPS may be available to the social networking system 100. The location of a client device 202 that is equipped with wireless communication functionality may be obtained from the cell towers that the client device interacts with. Another factor used to infer the location of a user is the locale of the user used to interact with the social networking system 100. For example, a user using French locale is likely to be located in France (subject to information inferred from other sources). The location of a user can also be provided by the user in the user profile. In an embodiment, conflicts in locations obtained from various sources are resolved by attaching a confidence score with the source, for example, the location obtained via GPS may be considered more reliable compared to location specified by the user. The confidence score of the inferred values from various sources is compared to determine a final inferred location of the user as well as the confidence score of the inferred location.

A machine learning module 310 may be used in the data modeling module 112 to refine the predictive regression models and the predictive factors selected for each income bracket. In one embodiment, a social networking system 100 uses a machine learning algorithm to analyze the conversion rates of targeted advertising to retrain the predictive model. Using feedback from the conversion rates of targeted advertising, the predictive model may be refined to include more or less predictive factors and the weights assigned to each predictive factor, or coefficients, can also be adjusted based upon the response, i.e., the conversion rates of a sampling of the targeted users.

Additionally, advertisers may be given more options in targeting users with advertisements based on income brackets because of discounts given based on the correlation value of an income bracket of users. For example, if a user maps to the $100,000-$125,000 bracket with a correlation value of 0.50 and maps to the $75,000-$100,000 bracket with a correlation value of 0.95, then an advertiser that decides to target to that user because of its association with the higher income bracket would receive a 50% discount based on that user's correlation value. Because the pricing of advertising may be associated with user's correlation values of the income brackets, the machine learning module 310 may be used, in one embodiment, to expand or reduce the number of users in each income bracket by adding or removing predictive factors from the regression models of the income brackets.

Figure 4:
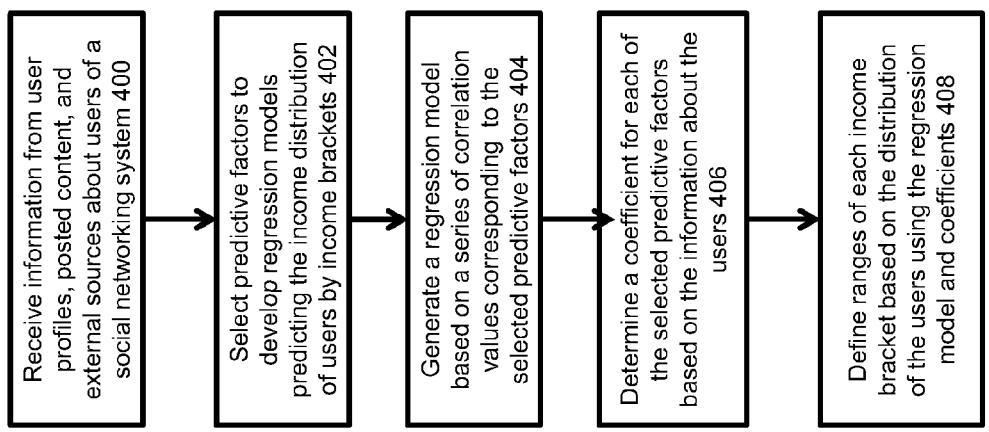
FIG. 4 is a flowchart of a process of developing a predictive model of income distribution for users of a social networking system, in accordance with an embodiment of the invention.

FIG. 4 illustrates a flow chart diagram depicting a process of developing a predictive model of income distribution for users of a social networking system, in accordance with an embodiment of the invention. Information captured from user profiles, posted content, and external sources about users of a social networking system is received 400 by the data modeling module 112. This information may include licensed data that includes household income information from the golden dataset of information, occupation, education level, location, interests, and the like.

After the information about users of the social networking system is received 400, predictive factors are selected 402 to develop regression models for predicting the income of users of the social networking system 100 by income brackets. An administrator may, in one embodiment, manually select the predictive factors, as discussed above, such as geographic location, education level, and purchasing habits using the predictive factor selection module 304. The predictive factor selection module 304 may select 402 these predictive factors, in another embodiment, based on the correlation values of the predictive factors as determined by the statistical correlation module 302.

After predictive factors for the income brackets of users have been selected 402, a regression model for each income bracket is generated 404 based on a series of correlation values corresponding to the selected predictive factors. The statistical correlation module 302 determines the series of correlation values corresponding to the selected predictive factors. The regression analysis module 306 generates 404 the regression model using these correlation values and determines 406 a coefficient for each predictive factor in the regression model based on the probabilistic distribution of users in the golden dataset which includes income information.

After a coefficient for each predictive factor in the regression model for each income bracket is determined 406, the ranges of each income bracket are defined 408. In one embodiment, the ranges of each income bracket may be arbitrarily defined 408 by administrators at fixed incremental values. In another embodiment, the ranges are defined 408 by the distribution of users in the golden dataset and the coefficients calculated for each predictive factor based on the response, or the income information in the golden dataset.

Mapping Users to Income Brackets Using a Predictive Model

Figure 5:
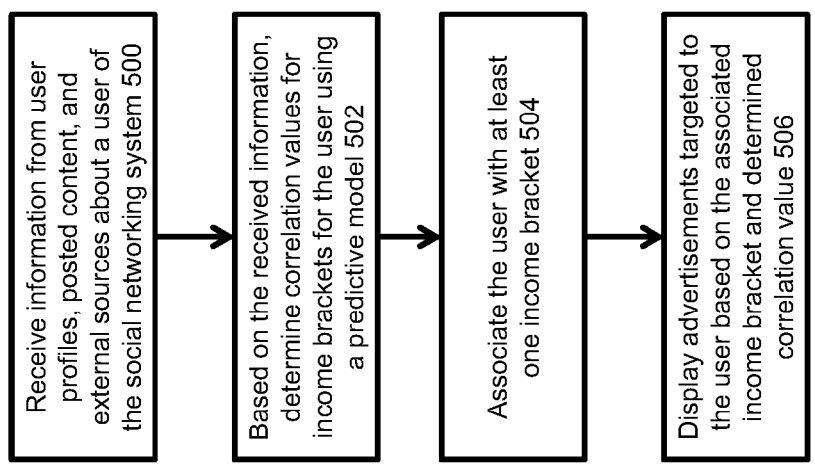
FIG. 5 is a flowchart of a process of inferring household income for users of a social networking system, in accordance with an embodiment of the invention.

FIG. 5 is a flowchart diagram depicting a process of inferring household income for users of a social networking system, in accordance with an embodiment of the invention. Information captured from user profiles, posted content, and external websites about users of a social networking system is received 500 by the data modeling module 112, similar to the first step in FIG. 4. There are many types of information that can be received by the user mapping module 114, depending on the predictive factors that have been included in the regression models for each income bracket as determined by the predictive factor selection module 304 and the regression analysis module 306. This information may include occupation, current city of residence, interests as indicated in the user profile, education, family members (household), and social information that includes high affinity connections and other users that interact frequently with the user (top friends).

In one embodiment, an analysis of posted content, by the heuristics analysis module 308, may be received to indicate the frequency of grammatical errors and language level in the posted content. In another embodiment, users' external website browsing histories may be analyzed by the heuristics analysis module 308 to indicate purchasing patterns, types of websites frequented, and level of interaction with different advertisers on the social networking system. For example, an assumption might be made about a user that reads CNN.com and nytimes.com every day that the user is in a higher income bracket than another user that only reads TMZ.com and PerezHilton.com on the theory that a user who reads newspapers might be assumed to make more money than a user who only reads celebrity gossip blogs. These types of customized assumptions may be created by administrators that have access to the external website browsing history data of users of the social networking system.

Location information, such as check-ins using GPS-enabled mobile devices and event information with an embedded location, may also be received 500 by the data modeling module 112. Further, emails and other messaging systems on the social networking system may be searched for keywords that indicate higher income users by the heuristics analysis module 308 and information about users would be received by the data modeling module 112. Users may choose to join or be associated with groups on a social networking system 100. Information about group membership may be used to infer income of users that are members. For example, a user's membership in a charitable giving foundation group on a social networking system may indicate that the user is in a higher income bracket than a user who is a member of a group dedicated to a popular music audition show. In one embodiment, the received information is only relevant for a limited period of time (such as check-in data) such that older received information may not be used by the data modeling module 112. The may be accomplished by applying a decay factor to the information or voiding the information after a period of time.

Based on the received information, confidence metrics for income brackets are determined 502 for the user using the predictive regression model generated by the regression analysis module 306. A confidence metric is determined 502 for each income bracket for each user because advertisers may be given the opportunity to target their advertisements to users in an income bracket at a discount based on the confidence metric corresponding to income bracket. For example, the regression analysis module 306 may determine a confidence metric of 0.85 that a user should be placed in the $50,000-$75,000 income bracket, a confidence metric of 0.50 that the same user should be placed in the $75,000-$100,000 income bracket, and a confidence metric of 0.30 that the same user should be placed in the $25,000-$50,000 income bracket based on the different regression models for the three income brackets. Advertisers may, in one embodiment, be given the opportunity to target the user as part of the $75,000-$100,000 income bracket at a 50% discount based on the confidence metric for that income bracket.

Each income bracket is stored as an income bracket object 116 in the income bracket store 216. Each user of the social networking system 100 is associated with a user profile information object 102 that is stored in the user profile information store 206. In one embodiment, as confidence metrics are determined 502 for a user, the user's user profile information object 102 is associated 504 with the corresponding the income bracket objects 116 for the determined confidence metrics. In another embodiment, the user's user profile information object 102 is associated 504 with the income bracket object 116 with the highest determined confidence metric for the user. As a result, advertisements that are targeted towards a specific income bracket are displayed 506 to the user that has been associated with the income bracket object 116.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving information about users of a social networking system, the information describing connections between users of the social networking system and actions taken by users on the social networking system, and comprises for each user, an analysis of posted content by the user that indicates a higher-than-average income potential or a lower-than-average income potential as compared to other analyses of posted content by other users in the social networking system;

defining, by a computer processor, a predictive model of an income bracket of an income distribution of the users of the social networking system by selecting predictive factors based on the received information about the users in the income bracket; and defining ranges for the income bracket based on the received information.

2. The method of claim 1, wherein the received information about the users of the social networking system includes income information.

3. The method of claim 1, wherein the received information about the users of the social networking system includes user profile information.

4. The method of claim 1, wherein the received information about the users of the social networking system includes unstructured information gathered from activity on the social networking system, the method further comprising:
   performing heuristic analysis on the unstructured information to generate a new predictive factor for the predictive model; and
   adding the new generated predictive factor to the predictive model.

5. The method of claim 1, wherein defining a predictive model of an income bracket further comprises:
   mapping the received information to the predictive factors; and
   selecting an initial set of predictive factors based on the received information.

6. The method of claim 1, further comprising:
   determining coefficients for the selected predictive factors in the predictive model of the income bracket, wherein determining coefficients for the selected predictive factors in the predictive model of the income bracket further comprises:
   utilizing the received information as a response in a regression model; and
   calculating the coefficients using the selected predictive factors as weighted factors in the regression model.

7. A method comprising:
   receiving information about a user of a social networking system, the information describing connections between users of the social networking system and actions taken by users on the social networking system;
   responsive to the received information, mapping the received information about the user to predictive factors in predictive models for income brackets in the social networking system;
   determining, by a computer processor, a correlation value for each income bracket for the user based on the predictive model corresponding to the income bracket;
   associating the user with at least one of the income brackets based on the determined correlation values;
   providing advertisements for display to the user based on the associated income brackets and determined correlation values; and
   modifying the predictive model of an income bracket to include or exclude additional predictive factors based on an analysis of conversion rates of advertisements provided to users based on the income bracket.

8. The method of claim 7, wherein the received information about the users of the social networking system includes user profile information.

9. The method of claim 7, wherein the received information about the users of the social networking system includes unstructured information gathered from activity on the social networking system, the method further comprising:
   performing heuristic analysis on the unstructured information to generate a new predictive factor for the predictive models; and
   adding the new generated predictive factor to the predictive models.

10. The method of claim 7, wherein the received information about the users of the social networking system includes, for each user, an analysis of posted content by the user indicates a higher-than-average income potential as compared to other analyses of posted content by other users in the social networking system.

11. The method of claim 7, wherein the received information about the users of the social networking system includes, for each user, an analysis of posted content by the user indicates a lower-than-average income potential as compared to other analyses of posted content by other users in the social networking system.

12. The method of claim 7, further comprising:
   discounting the pricing of advertisements based on the determined correlation values of the income brackets.

13. The method of claim 1, wherein the actions taken by users on the social networking system are selected from a group consisting of: commenting on a photo album, communications between users, becoming a fan of a musician, adding an event to a calendar, or interactions with advertisements on the social networking system.

14. The method of claim 1, wherein information describing connections between users of the social networking system are selected from a group consisting of: wall posts, comments on photos, geographic places where they have been tagged together, photos in which they have both been tagged in, or strength of the connection between users.

* * * * *